United States Patent
Ito et al.

(10) Patent No.: US 10,486,677 B2
(45) Date of Patent: Nov. 26, 2019

(54) VEHICLE CONTROL APPARATUS

(71) Applicant: TOYOTA JIDOSHA KABUSHIKI KAISHA, Toyota-shi, Aichi-ken (JP)

(72) Inventors: Hironori Ito, Susono (JP); Akira Nagae, Susono (JP); Ryo Inomata, Kanagawa-ken (JP); Masayuki Ikeda, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 172 days.

(21) Appl. No.: 15/700,495

(22) Filed: Sep. 11, 2017

(65) Prior Publication Data

US 2018/0072297 A1 Mar. 15, 2018

(30) Foreign Application Priority Data

Sep. 13, 2016 (JP) ................. 2016-178778

(51) Int. Cl.
*B60W 10/06* (2006.01)
*B60W 50/06* (2006.01)
(Continued)

(52) U.S. Cl.
CPC .......... *B60W 10/06* (2013.01); *B60W 10/184* (2013.01); *B60W 30/12* (2013.01); *B60W 50/06* (2013.01); *F02D 13/0234* (2013.01); *F02D 13/0261* (2013.01); *F02D 15/00* (2013.01); *F02D 41/0005* (2013.01); *F02D 41/0007* (2013.01); *F02D 41/0055* (2013.01); *F02D 41/0087* (2013.01); *F02D 41/045* (2013.01); *F02D 41/107* (2013.01); *F02D 41/1454* (2013.01); *F02P 5/045* (2013.01); *B60W 10/20* (2013.01); *B60W 2540/10* (2013.01); *B62D 6/003* (2013.01); *F02B 25/145* (2013.01); *F02D 2041/001* (2013.01); *F02D 2200/501* (2013.01);
(Continued)

(58) Field of Classification Search
CPC .............. B60W 10/06; B60W 10/184; B60W 2540/10; B60W 2540/103; B60W 2540/106; B60W 2540/12; F02D 41/0087; F02D 41/045; F02D 41/107; F02D 41/1454; F02D 41/0005; F02D 41/0007; F02D 41/0055
See application file for complete search history.

(56) References Cited

U.S. PATENT DOCUMENTS

| 6,577,334 B1 | 6/2003 | Kawai et al. |
| 2002/0019291 A1 | 2/2002 | Ito |

(Continued)

FOREIGN PATENT DOCUMENTS

| JP | 2000-105898 A | 4/2000 |
| JP | 2002047989 A | 2/2002 |
| JP | 2002364347 A | 12/2002 |
| JP | 2004060475 A | 2/2004 |
| JP | 2004-270718 A | 9/2004 |

(Continued)

*Primary Examiner* — Jacob M Amick
(74) *Attorney, Agent, or Firm* — Sughrue Mion, PLLC

(57) ABSTRACT

A vehicle control apparatus includes an electronic control device that controls an internal combustion engine such that a response delay of the internal combustion engine at the time of acceleration is restrained for a predetermined time period from the time point at which an acceleration demand of a driver of a vehicle is estimated when the acceleration demand is estimated while the vehicle is travelling using a driving force from the internal combustion engine.

15 Claims, 9 Drawing Sheets

(51) Int. Cl.
*F02D 41/04* (2006.01)
*F02D 41/10* (2006.01)
*B60W 10/184* (2012.01)
*B60W 30/12* (2006.01)
*F02D 41/00* (2006.01)
*F02D 41/14* (2006.01)
*F02D 13/02* (2006.01)
*F02P 5/04* (2006.01)
*F02D 15/00* (2006.01)
*B60W 10/20* (2006.01)
*B62D 6/00* (2006.01)
*F02B 25/14* (2006.01)

(52) U.S. Cl.
CPC .... *F02D 2200/602* (2013.01); *F02D 2250/21* (2013.01); *F02D 2250/22* (2013.01)

(56) References Cited

U.S. PATENT DOCUMENTS

| | | | |
|---|---|---|---|
| 2008/0216780 | A1 | 9/2008 | Nakamura |
| 2015/0127200 | A1* | 5/2015 | Takeuchi ............. B60W 10/04 701/22 |

FOREIGN PATENT DOCUMENTS

| | | |
|---|---|---|
| JP | 2006242111 A | 9/2006 |
| JP | 2006-282168 A | 10/2006 |
| JP | 2008038662 A | 2/2008 |
| JP | 2008215327 A | 9/2008 |
| JP | 2010156274 A | 7/2010 |
| JP | 2011137411 A | 7/2011 |
| JP | 2014020288 A | 2/2014 |
| JP | 2014088782 A | 5/2014 |
| JP | 2015183520 A | 10/2015 |
| JP | 2015214920 A | 12/2015 |

* cited by examiner

VEHICLE CONTROL APPARATUS

INCORPORATION BY REFERENCE

The disclosure of Japanese Patent Application No. 2016-178778 filed on Sep. 13, 2016 including the specification, drawings and abstract is incorporated herein by reference in its entirety.

BACKGROUND

1. Technical Field

The disclosure relates to a vehicle control apparatus.

2. Description of Related Art

As a vehicle control apparatus, a lane departure preventing apparatus has been proposed. In the lane departure preventing apparatus, a yaw moment in a direction avoiding lane departure is generated due to the difference in braking force of right and left wheels, for example, when a host vehicle likely to depart from a travelling lane (refer to Japanese Unexamined Patent Application Publication No. 2006-282168 (JP 2006-282168 A)).

SUMMARY

In the related art, avoiding lane departure causes deceleration that is not intended by a driver. In this case, it is assumed that the driver performs an accelerating operation (that is, steps on an accelerator pedal) in order to regain the speed before the deceleration. However, after the driver performs the accelerating operation, an internal combustion engine is controlled such that the output of the internal combustion engine increases. In some cases, even though the accelerating operation is performed, a control operation in which the fuel efficiency is prioritized over acceleration responsiveness of a vehicle is performed depending on the operation amount of the accelerator pedal. Consequently, even though the driver performs the accelerating operation immediately after the deceleration, it is not possible to instantly achieve demanded torque, so that regaining the speed before the deceleration is delayed.

Similarly, the delay in regaining the speed before the deceleration is not limited to a case of reacceleration immediately after the deceleration. For example, there is a possibility that the delay may also be caused when the driver performs the accelerating operation while the vehicle is travelling at a constant speed.

The disclosure provides a vehicle control apparatus that can restrain a response delay of an internal combustion engine when a driver performs an accelerating operation while a vehicle is travelling.

An aspect of the disclosure relates to a vehicle control apparatus including an electronic control device configured to perform acceleration preparation in which an internal combustion engine is controlled such that a response delay of the internal combustion engine at a time of acceleration is restrained for a predetermined time period from a time point at which an acceleration demand of a driver of a vehicle is estimated when the acceleration demand is estimated while the vehicle is travelling using a driving force from the internal combustion engine.

According to the aspect, the internal combustion engine is controlled such that the response delay of the internal combustion engine at the time of acceleration is restrained for the predetermined time period from the time point at which the acceleration demand is estimated when the acceleration demand of the driver is estimated while the vehicle is travelling (that is, before the driver performs an accelerating operation). In other words, the internal combustion engine is controlled such that the vehicle is more likely to accelerate. Specifically, in the vehicle control apparatus, the internal combustion engine is controlled such that the internal combustion engine is in a state where output responsiveness related to the internal combustion engine can be improved for the predetermined time period from the time point at which the acceleration demand of the driver is estimated (that is, a state where the internal combustion engine can sufficiently exhibit its performance). Therefore, with the vehicle control apparatus, it is possible to restrain a response delay of an internal combustion engine when a driver performs an accelerating operation while a vehicle is travelling.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments of a vehicle control apparatus according to the disclosure will be described with reference to the drawings.

First Embodiment

A first embodiment of the vehicle control apparatus according to the disclosure will be described with reference to FIGS. 1 to 14. In the first embodiment below, descriptions will proceed by using a vehicle 1 in which the vehicle control apparatus of the disclosure is mounted.

Configuration of Vehicle

Figure 1:
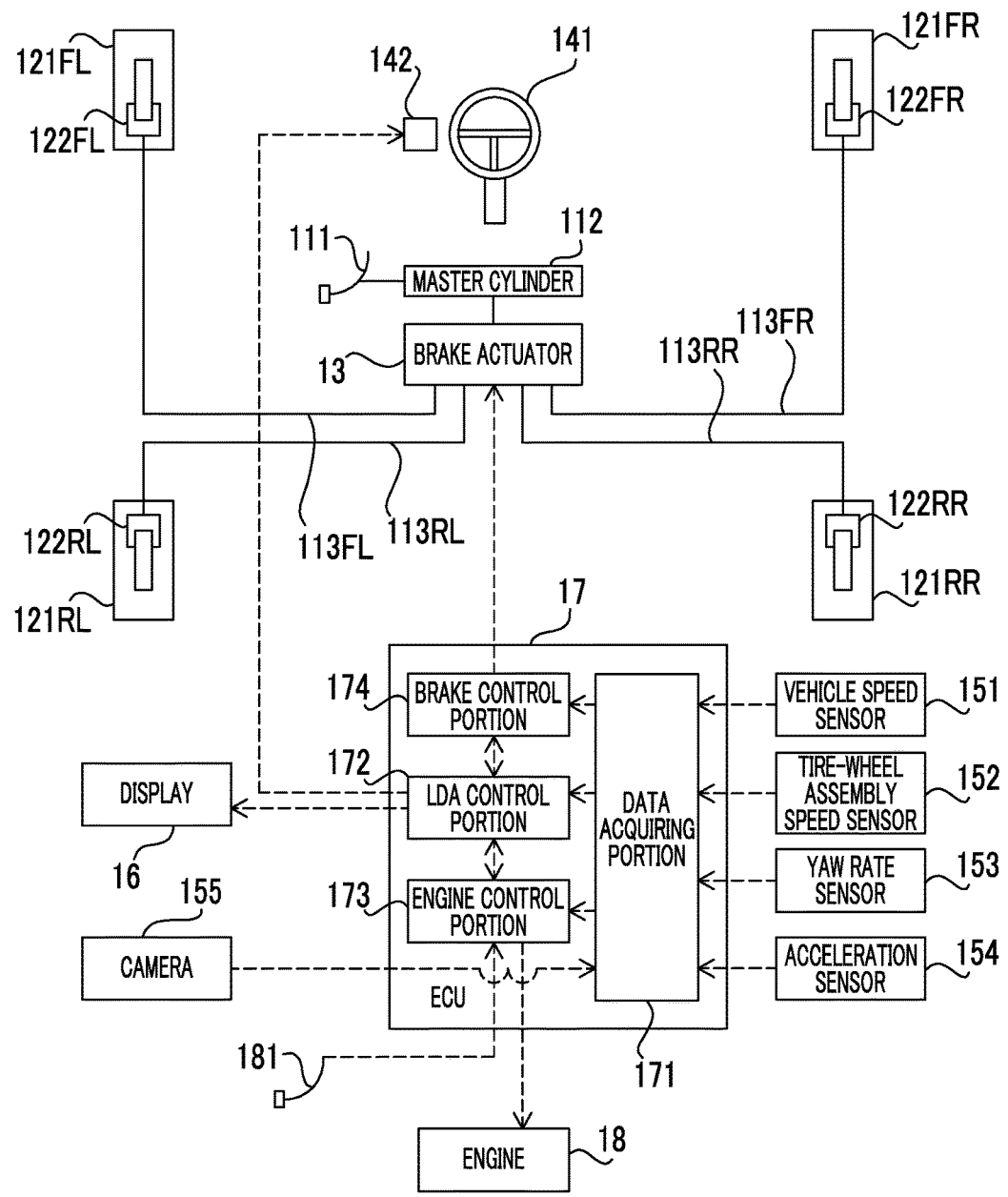
FIG. 1 is a block diagram illustrating a configuration of a vehicle according to a first embodiment.

The configuration of the vehicle 1 will be described with reference to FIG. 1. FIG. 1 is a block diagram illustrating a configuration of a vehicle according to the first embodiment.

In FIG. 1, the vehicle 1 includes a brake pedal 111, a master cylinder 112, a brake actuator 13, a wheel cylinder 122FL installed in a front left wheel 121FL, a wheel cylinder 122RL installed in a rear left wheel 121RL, a wheel cylinder 122FR installed in a front right wheel 121FR, a wheel cylinder 122RR installed in a rear right wheel 121RR, and brake pipes 113FL, 113RL, 113FR, 113RR.

Moreover, the vehicle 1 includes an engine 18 that is a specific example of "internal combustion engine", an accelerator pedal 181, a steering wheel 141, a vibration actuator 142, a vehicle speed sensor 151, a tire-wheel assembly speed sensor 152, a yaw rate sensor 153, an acceleration sensor 154, a camera 155, a display 16, and an electronic control unit (ECU) 17 that is a specific example of "vehicle control apparatus".

The master cylinder 112 adjusts the pressure of a brake fluid (or an arbitrary fluid) inside the master cylinder 112 in accordance with a stepping operation amount of the brake pedal 111. The pressure of the brake fluid inside the master cylinder 112 is transmitted to each of the wheel cylinders 122FL, 122RL, 122FR, 122RR via a corresponding one of the brake pipes 113FL, 113RL, 113FR, 113RR. As a result, braking force corresponding to the pressure of the brake fluid transmitted to one of the wheel cylinders 122FL, 122RL, 122FR, 122RR is applied to a corresponding one of the front left wheel 121FL, the rear left wheel 121RL, the front right wheel 121FR, and the rear right wheel 121RR.

The brake actuator 13 being under the control of the ECU 17 can adjust the pressure of the brake fluid to be transmitted to each of the wheel cylinders 122FL, 122RL, 122FR, 122RR, regardless of the stepping operation amount of the brake pedal 111. Therefore, the brake actuator 13 can adjust the braking force to be applied to each of the front left wheel 121FL, the rear left wheel 121RL, the front right wheel 121FR, and the rear right wheel 121RR, regardless of the stepping operation amount of the brake pedal 111.

The steering wheel 141 is an operation member operated by a driver in order to steer the vehicle 1 (that is, to steer the steering tire-wheel assemblies). The vibration actuator 142 being under the control of the ECU 17 can cause the steering wheel 141 to vibrate.

The ECU 17 controls the operation of the vehicle 1 in its entirety. In the present embodiment, particularly, the ECU 17 performs a lane departure restraining operation so that the vehicle 1 is restrained from departing from the travelling lane in which the vehicle 1 is currently travelling. That is, the ECU 17 functions as a control device realizing so-called lane departure alert (LDA) or lane departure prevention (LDP).

As processing blocks logically realized or processing circuits physically realized, the ECU 17 internally includes a data acquiring portion 171, an LDA control portion 172, an engine control portion 173, and a brake control portion 174, thereby performing the lane departure restraining operation.

Lane Departure Restraining Operation

Next, the lane departure restraining operation according to the present embodiment will be described with reference to the flowchart in FIG. 2.

Overview of Lane Departure Restraining Operation

The LDA control portion 172 in the ECU 17 determines whether or not there is a possibility that the vehicle 1 will depart from the travelling lane in which the vehicle 1 is currently travelling, based on the detection data acquired by the data acquiring portion 171 (that is, data showing detection results from each of the vehicle speed sensor 151, the tire-wheel assembly speed sensor 152, the yaw rate sensor 153, and the acceleration sensor 154), and image data imaged by the camera 155.

In order to apply a restraining yaw moment to the vehicle 1 so that lane departure of the vehicle 1 can be restrained when there is a possibility of lane departure of the vehicle 1, the LDA control portion 172 applies braking force to at least one of the front left wheel 121FL, the rear left wheel 121RL, the front right wheel 121FR, and the rear right wheel 121RR. That is, in the present embodiment, the difference in braking force is used for restraining the vehicle 1 from departing from the travelling lane. Hereinafter, "lane departure restraining" in the present embodiment will be suitably referred to as "brake LDA".

Here, the expression "restraining lane departure of the vehicle 1" denotes that a departure distance from a travelling lane in a case where a restraining yaw moment is applied to the vehicle 1 is reduced compared to a departure distance from the travelling lane in a case where no restraining yaw moment is applied to the vehicle 1.

Detailed Description of Lane Departure Restraining Operation

Figure 2:
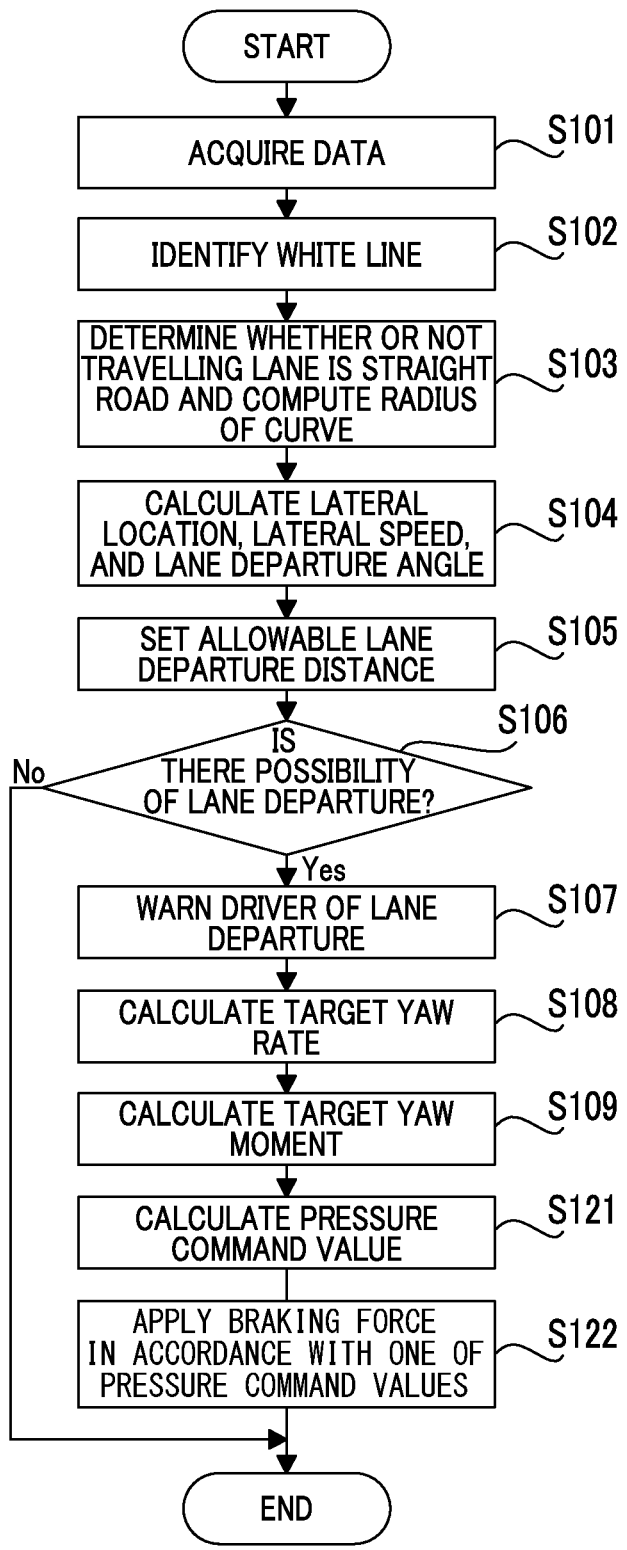
FIG. 2 is a flowchart illustrating a lane departure restraining operation according to the first embodiment.

In FIG. 2, first, the data acquiring portion 171 acquires the detection data showing the detection results from each of the vehicle speed sensor 151, the tire-wheel assembly speed sensor 152, the yaw rate sensor 153, and the acceleration sensor 154; and the image data showing an image imaged by the camera 155 (Step S101).

The LDA control portion 172 analyzes the image data acquired through the processing in Step S101, thereby identifying a lane edge (in the present embodiment, "white line" is taken as an example of the lane edge) of the travelling lane in which the vehicle 1 is currently travelling, within the image imaged by the camera 155 (Step S102).

Based on the white line identified through the processing in Step S102, the LDA control portion 172 determines whether the travelling lane in which the vehicle 1 is currently travelling is a straight road or a curved road. When the LDA control portion 172 determines that the travelling lane is a curved road, the LDA control portion 172 calculates the radius of curvature of the travelling lane (Step S103). The radius of curvature of the travelling lane is practically equal to the radius of curvature of the white line. Therefore, the LDA control portion 172 may calculate the radius of curvature of the white line identified through the processing in Step S102 and may take the calculated radius of curvature of the white line as the radius of curvature of the travelling lane.

Moreover, based on the white line identified through the processing in Step S102, the LDA control portion 172 calculates the current lateral location, the current lateral speed, and the current lane departure angle of the vehicle 1 (Step S104). Here, the term "lateral location" denotes a distance from the center of the travelling lane to the vehicle 1 (typically, a distance to the center of the vehicle 1) along the lane width direction orthogonal to a direction in which the travelling lane extends (lane extending direction). The term "lateral speed" denotes a speed of the vehicle 1 along the lane width direction. The term "lane departure angle" denotes an angle formed by the travelling lane and the forward-rearward directional axis of the vehicle 1 (that is, an angle formed by the white line and the forward-rearward directional axis of the vehicle 1).

Moreover, the LDA control portion 172 sets an allowable lane departure distance (Step S105). The allowable lane departure distance indicates the maximum allowable value for the departure distance of the vehicle 1 from the travelling lane (that is, the departure distance of the vehicle 1 from the white line) in a case where the vehicle 1 departs from the travelling lane. Therefore, the lane departure restraining operation functions as an operation in which a restraining yaw moment is applied to the vehicle 1 such that the departure distance of the vehicle 1 from the travelling lane stays within the allowable lane departure distance.

For example, the allowable lane departure distance may be set as follows. That is, the LDA control portion 172 may set the allowable lane departure distance from the viewpoint of satisfying the demands of the law and regulations (for example, demands of New Car Assessment Programme (NCAP)). The allowable lane departure distance set from such a viewpoint may be used as an allowable default lane departure distance. The method of setting the allowable lane departure distance is not limited to the above-described example.

Thereafter, the LDA control portion 172 determines whether or not there is a possibility that the vehicle 1 will depart from the travelling lane in which the vehicle 1 is currently travelling (Step S106). Specifically, for example, the LDA control portion 172 calculates a prospective (for example, after several seconds to several tens of seconds) position of the vehicle 1 based on the current speed, the current lateral location, and the current lateral speed of the vehicle 1. Then, the LDA control portion 172 determines whether or not the vehicle 1 will straddle or tread on the white line at the prospective position. When the LDA control portion 172 determines that the vehicle 1 will straddle or tread on the white line at the prospective position, the LDA control portion 172 determines that there is a possibility that the vehicle 1 will depart from the travelling lane.

When the LDA control portion 172 determines through the determination in Step S106 that there is no possibility that the vehicle 1 will depart from the travelling lane (No in Step S106), the lane departure restraining operation illustrated in FIG. 2 ends. Thereafter, the LDA control portion 172 restarts the lane departure restraining operation illustrated in FIG. 2, after the lapse of a first predetermined time period (for example, several milliseconds to several tens of milliseconds). That is, the lane departure restraining operation illustrated in FIG. 2 is repetitively performed on a cycle corresponding to the first predetermined time period.

On the other hand, when the LDA control portion 172 determines through the determination in Step S106 that there is a possibility that the vehicle 1 will depart from the travelling lane (Yes in Step S106), the LDA control portion 172 causes a control flag related to the brake LDA to be ON and warns the driver of the vehicle 1 against the possibility that the vehicle 1 will depart from the travelling lane (Step S107). Specifically, for example, the LDA control portion 172 controls the display 16 such that the display 16 displays an image indicating the possibility that the vehicle 1 will depart from the travelling lane, and/or the LDA control portion 172 controls the vibration actuator 142 such that the steering wheel 141 vibrates and the driver is informed of the possibility that the vehicle 1 will depart from the travelling lane.

When the LDA control portion 172 determines that there is a possibility that the vehicle 1 will depart from the travelling lane, the LDA control portion 172 further calculates a new travelling track in which the vehicle 1 travelling in a manner of being away from the center of the travelling lane is expected to travel in a manner of being oriented toward the center of the new travelling lane. In this case, the calculated travelling track satisfies the limitation of the allowable lane departure distance set through the processing in Step S105. The LDA control portion 172 calculates a yaw rate as a target yaw rate to be generated in the vehicle 1 in order to cause the vehicle 1 to travel along the new travelling track (Step S108).

Subsequently, in order to generate the target yaw rate in the vehicle 1, the LDA control portion 172 calculates a yaw moment as a target yaw moment to be applied to the vehicle 1 (Step S109). For example, the LDA control portion 172 may calculate the target yaw moment by transforming the target yaw rate into the target yaw moment based on a predetermined transform function. The target yaw moment is equal to the restraining yaw moment.

Subsequently, the LDA control portion 172 calculates the braking force that can apply the target yaw moment to the vehicle 1. In this case, the LDA control portion 172 individually calculates the braking force to be applied to each of the front left wheel 121FL, the rear left wheel 121RL, the front right wheel 121FR, and the rear right wheel 121RR.

Thereafter, the brake control portion 174 calculates a pressure command value designating the pressure of the brake fluid incidental to generating the braking force calculated by the LDA control portion 172 (Step S121). In this case, the brake control portion 174 individually calculates the pressure command values each designating the pressure of the brake fluid inside a corresponding one of the wheel cylinders 122FL, 122RL, 122FR, 122RR.

Thereafter, the brake control portion 174 controls the brake actuator 13 based on the pressure command values calculated through the processing in Step S121. As a result, braking force corresponding to one of the pressure command values is applied to at least a corresponding one of the front left wheel 121FL, the rear left wheel 121RL, the front right wheel 121FR, and the rear right wheel 121RR (Step S122).

Thereafter, the LDA control portion 172 restarts the lane departure restraining operation illustrated in FIG. 2, after the lapse of the first predetermined time period. Here, since the control flag related to the brake LDA is ON, the lane departure restraining operation starts while the restraining yaw moment is being applied to the vehicle 1.

In this case, when the LDA control portion 172 determines through the determination in Step S106 executed again that there is a possibility that the vehicle 1 will depart from the travelling lane (Yes in Step S106), since the processing in Step S107 and thereafter is performed, the restraining yaw moment is continuously applied to the vehicle 1. On the other hand, when the LDA control portion 172 determines through the determination in Step S106 executed again that there is no possibility that the vehicle 1 will depart from the travelling lane (No in Step S106), the control flag related to the brake LDA is caused to be OFF, and applying the restraining yaw moment to the vehicle 1 ends (that is, the lane departure restraining operation illustrated in FIG. 2 ends).

Reacceleration Preparing Operation

Incidentally, the engine control portion 173 controls the operation state of the engine 18 such that the engine 18 is in an appropriate state in accordance with the travelling state of the vehicle 1. Specifically, the engine control portion 173 controls parameters related to the engine 18, for example, an ignition phase, a fuel injection time, a fuel supply quantity, a throttle opening degree, turbocharging pressure of a turbocharger, a valve operation time, and a lift amount of a valve such that the parameters are set to appropriate values in accordance with the travelling state of the vehicle 1.

Therefore, unless countermeasures are employed in some way, in a case where the vehicle 1 decelerates due to an execution of the brake LDA, there is a possibility that the engine control portion 173 will control the engine 18 such that the driving force from the engine 18 is reduced. On the other hand, since deceleration caused due to the brake LDA is not intended by the driver of the vehicle 1, it is assumed that the driver performs an accelerating operation so as to regain the speed before the deceleration. However, even though the driver performs the accelerating operation immediately after the deceleration, in a case where the engine 18 is controlled as described above, sufficient driving force is not output from the engine 18, so that regaining the speed before the deceleration is delayed.

Figure 3:
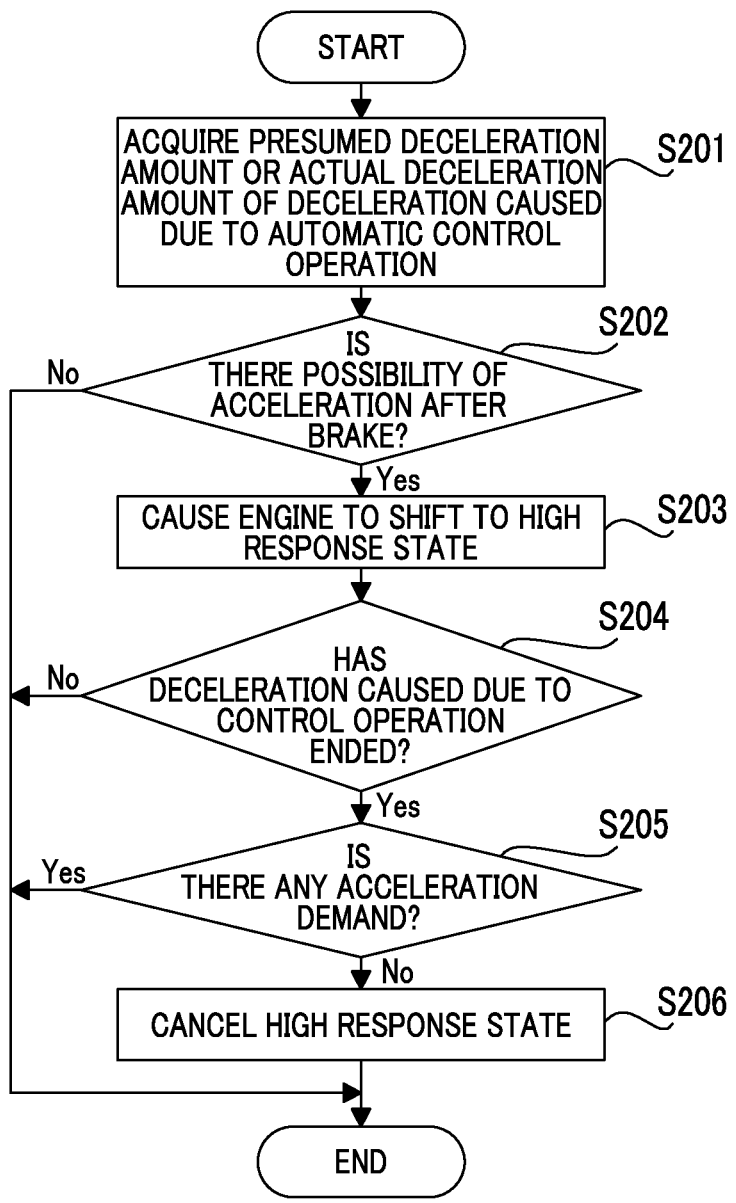
FIG. 3 is a flowchart illustrating a reacceleration preparing operation of an engine according to the first embodiment.

In the present embodiment, in order to cope with an accelerating operation performed by the driver after the brake LDA is executed, the ECU 17 causes the engine 18 to execute a reacceleration preparing operation illustrated in FIG. 3. The reacceleration preparing operation starts on condition that the control flag related to the brake LDA is caused to be ON by the LDA control portion 172 through the lane departure restraining operation illustrated in FIG. 2.

In FIG. 3, first, the LDA control portion 172 acquires a estimated deceleration amount or an actual deceleration amount of the deceleration caused due to the brake LDA (Step S201). The estimated deceleration amount may be estimated based on the target yaw moment that has been calculated through the processing in Step S109 or the braking force that can apply the target yaw moment to the vehicle 1. The actual deceleration amount may be acquired based on the detection data that has been acquired by the data acquiring portion 171 and shows the detection results from the vehicle speed sensor 151.

Subsequently, the LDA control portion 172 determines whether or not a possibility of an accelerating operation to be performed by the driver of the vehicle 1 (that is, an acceleration demand of the driver) is estimated after a brake caused due to the brake LDA (Step S202). For example, when the vehicle 1 is controlled so as to automatically decelerate and there are no objects that can hinder the vehicle 1 from travelling, within a first distance range ahead of the vehicle 1, the LDA control portion 172 determines that an acceleration demand of the driver is estimated.

When the brake LDA is activated, the vehicle 1 decelerates regardless of the vehicle-to-vehicle distance from a preceding vehicle, the vehicle speed of the vehicle 1, and the intention of the driver, for example. Therefore, the LDA control portion 172 may determine through the determination in Step S202 that an acceleration demand of the driver is estimated, merely based on the execution of the brake LDA.

When the LDA control portion 172 determines through the determination in Step S202 that no acceleration demand of the driver is estimated (No in Step S202), the reacceleration preparing operation of the engine 18 illustrated in FIG. 3 ends.

On the other hand, when the LDA control portion 172 determines through the determination in Step S202 that an acceleration demand of the driver is estimated (Yes in Step S202), the LDA control portion 172 causes a flag related to a high response demand to be ON and causes the engine control portion 173 to control the engine 18 such that the state of the engine 18 shifts to a high response state that is a state where output responsiveness related to the engine 18 can be improved (that is, a state where the engine 18 can sufficiently exhibit its performance) (Step S203). Specific examples of the high response state will be described later. In the embodiment, "high response state" is an example of "predetermined state".

Thereafter, the LDA control portion 172 determines whether or not the deceleration of the vehicle 1 caused due to the brake LDA has ended (that is, whether or not applying the restraining yaw moment to the vehicle 1 has ended) (Step S204). Here, when the control flag related to the brake LDA is OFF, the LDA control portion 172 may determine that the deceleration of the vehicle 1 resulting from the brake LDA has ended.

Through the determination in Step S204, when the LDA control portion 172 determines that the deceleration of the vehicle 1 resulting from the brake LDA has not ended (No in Step S204), the reacceleration preparing operation of the engine 18 illustrated in FIG. 3 ends. Here, since the flag related to a high response demand is ON, the LDA control portion 172 restarts the reacceleration preparing operation of the engine 18 illustrated in FIG. 3, after the lapse of a second predetermined time period (for example, several milliseconds to several tens of milliseconds). In this case, the processing in Step S203 and thereafter is executed again.

On the other hand, through the determination in Step S204, when the LDA control portion 172 determines that the deceleration of the vehicle 1 resulting from the brake LDA has ended (Yes in Step S204), the LDA control portion 172 determines whether or not determination conditions for determining that there is no acceleration demand of the driver are fulfilled (Step S205).

Examples of the determination conditions are as follows: (i) the control flag related to the brake LDA is caused to be ON, and then, there is no variation in the stepping operation amount of the accelerator pedal 181 or the amount of variation in the stepping operation amount is within a predetermined variation range for the first predetermined time period; and (ii) the flag related to a high response demand is caused to be ON, and then, a different vehicle or an obstacle is detected within a second distance range ahead of the vehicle 1.

The determination conditions may also include the followings: (i) the restraining yaw moment is applied to the vehicle 1 due to the brake LDA, and then, the second predetermined time period elapses; (ii) the control flag related to the brake LDA is caused to be ON, and then, a state where the yaw rate related to the vehicle 1 is within a predetermined yaw rate range (or the absolute value of the yaw rate is equal to or smaller than a predetermined value) continues for a third predetermined time period; (iii) the control flag related to the brake LDA is caused to be ON, and then, a state where the lateral location of the vehicle 1 (that is, a distance from the center of the travelling lane to the vehicle 1 in the lane width direction) is within a third distance range continues for a fourth predetermined time period; and the like.

When the LDA control portion 172 determines through the determination in Step S205 that there is no acceleration demand of the driver (No in Step S205), the LDA control portion 172 causes the engine control portion 173 to control the engine 18 such that the high response state is cancelled, and causes the flag related to a high response demand to be OFF (Step S206). That is, the reacceleration preparing operation of the engine 18 illustrated in FIG. 3 ends.

On the other hand, when the LDA control portion 172 determines through the determination in Step S205 that there are any acceleration demand of the driver (Yes in Step S205), the reacceleration preparing operation of the engine 18 illustrated in FIG. 3 ends. Here, since the flag related to a high response demand is ON, the LDA control portion 172 restarts the reacceleration preparing operation of the engine 18 illustrated in FIG. 3, after the lapse of the second predetermined time period. In this case, the processing in Step S203 and thereafter is executed again.

High Response State of Engine

Next, detailed descriptions will be given regarding control operations of the engine 18 causing the engine 18 to be in a high response state. Hereinafter, along with examples of physical quantities and parameters to be changed in order to cause the engine 18 to be in the high response state, descriptions will be given regarding the control operations executed by the LDA control portion 172.

The processing in Step S203 is satisfied as long as at least one of a plurality of the following control operations is executed. Two or more of the control operations may also be executed. The control operations also include control operations that cannot be selected depending on the specification of the engine 18 or the operation state of the engine 18. However, as long as at least one of the control operations is executed, the state of the engine 18 can shift to the high response state.

A. Air-fuel Ratio

In order to cause the engine 18 to be in the high response state, the LDA control portion 172 controls the engine control portion 173 such that at least one of the intake air quantity and the fuel supply quantity changes and the air-fuel ratio varies to be in a lower side (that is, the reduced side) compared to the air-fuel ratio at the starting time point of the brake LDA (refer to "T_on" of the time chart in FIG. 4) (that is, a command signal is transmitted to the engine control portion 173). The time chart in FIG. 4 will be described later in detail.

Figure 4:
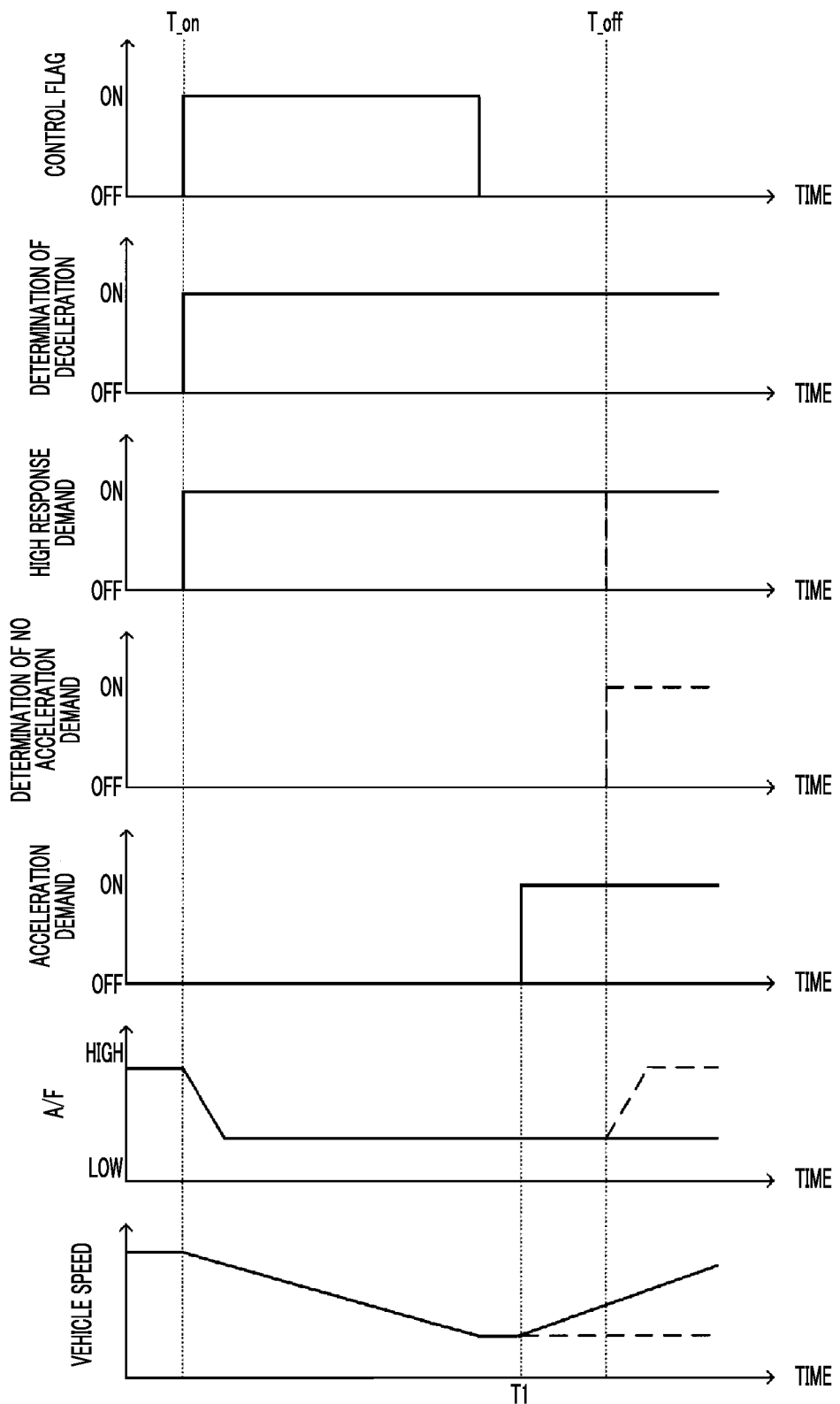
FIG. 4 is a time chart illustrating an example of the reacceleration preparing operation according to the first embodiment.

While the vehicle 1 is on a cruise (that is, while the vehicle 1 is travelling at a constant speed, in other words, before the brake LDA starts), from the viewpoint of improving the fuel efficiency, for example, as illustrated in the graph related to the air-fuel ratio (A/F) on the second line from the bottom in FIG. 4, the air-fuel ratio is often caused to be higher than a stoichiometric air-fuel ratio (that is, the air-fuel ratio is relatively large). Here, when the air-fuel ratio has a relatively large value, an output of the engine 18 is reduced compared to when the air-fuel ratio has a relatively small value.

If the air-fuel ratio is caused to vary in advance to be in a lower side compared to the air-fuel ratio at the starting time point of the brake LDA (that is, before there is an acceleration demand of the driver), when there is an acceleration demand from the driver (for example, when the driver steps on the accelerator pedal 181), an output (for example, demanded torque) in accordance with the acceleration demand is promptly output from the engine 18 (that is, the output responsiveness of the engine 18 can be improved).

It is desirable to perform the control operation such that the driving force transmitted from the engine 18 to the driving wheels does not vary before there is an acceleration demand of the driver after the engine 18 is caused to be in a high response state (hereinafter, the same will be applied).

B. EGR Rate

In order to cause the engine 18 to be in the high response state, the LDA control portion 172 controls the engine control portion 173 such that the EGR rate (that is, a ratio of the quantity of exhaust gas flowing into one cylinder of the engine 18 to the quantity of air flowing into the same cylinder) is reduced compared to the EGR rate at the starting time point of the brake LDA. The EGR may be so-called external EGR or may be so-called internal EGR.

Figure 5:
FIG. 5 is a time chart illustrating an example of variation in an EGR rate, which is a part of the reacceleration preparing operation according to the first embodiment.

While the vehicle 1 is on a cruise, from the viewpoint of improving the fuel efficiency and the like, for example, as illustrated in FIG. 5, the EGR rate is often caused to be relatively high. Here, when the EGR rate is relatively high, since the volume of oxygen inside the cylinder is small compared to when the EGR rate is relatively low, the output of the engine 18 is reduced. If the EGR rate is lowered in advance compared to the EGR rate at the starting time point of the brake LDA, the output responsiveness of the engine 18 can be improved.

C. Cylinder at Standstill/Fuel Cut (F/C)

When the engine 18 has a plurality of cylinders and is configured to be able to bring a part of the cylinders to a standstill or to be able to bring the part of the cylinders to a halt in fuel supply while the internal combustion engine is in operation, in order to cause the engine 18 to be in the high response state, the LDA control portion 172 controls the engine control portion 173 such that the number of cylinders at a standstill or the number of cylinders brought to a halt in fuel supply is reduced compared to the number of cylinders at the starting time point of the brake LDA.

Figure 6:
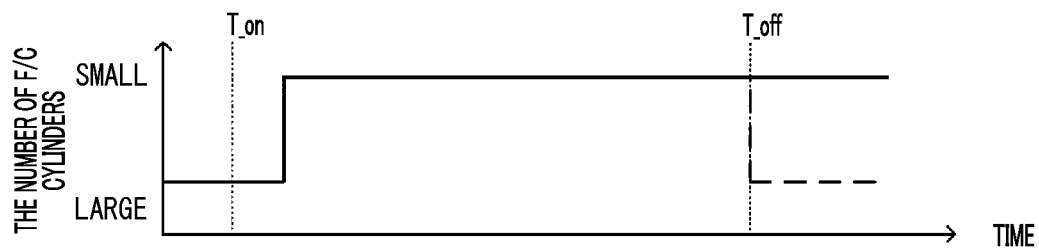
FIG. 6 is a time chart illustrating an example of variation in the number of fuel cut cylinders, which is a part of the reacceleration preparing operation according to the first embodiment.

While the vehicle 1 is on a cruise, from the viewpoint of improving the fuel efficiency, for example, as illustrated in FIG. 6, the number of F/C cylinders (synonymous with the number of cylinders at a standstill) is often caused to be relatively large. If the number of the F/C cylinders is reduced in advance compared to the number of the F/C cylinders at the starting time point of the brake LDA, the output responsiveness of the engine 18 can be improved.

In FIG. 6, the time of reducing the number of the F/C cylinders is delayed from T_on due to the ignition time of the cylinders brought to a halt in fuel supply (or at a standstill).

D. Throttle Opening Degree

In order to cause the engine 18 to be in the high response state, the LDA control portion 172 controls the engine control portion 173 such that the throttle opening degree increases compared to the throttle opening degree at the starting time point of the brake LDA. The engine 18 is postulated to be provided with an electric throttle.

Figure 7:
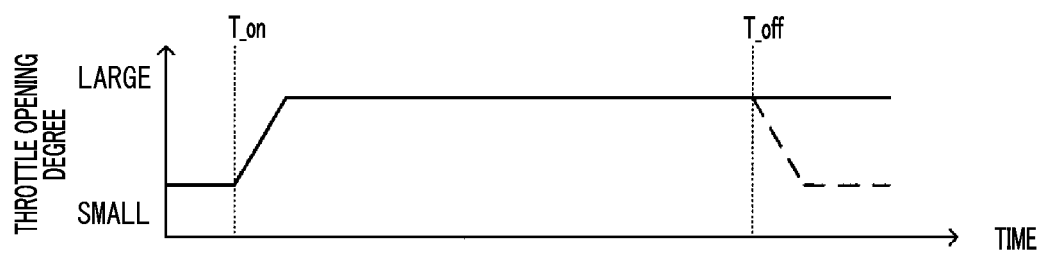
FIG. 7 is a time chart illustrating an example of variation in a throttle opening degree, which is a part of the reacceleration preparing operation according to the first embodiment.

While the vehicle 1 is on a cruise, the demanded output of the engine 18 is small compared to when the vehicle 1 accelerates. Therefore, for example, as illustrated in FIG. 7, the throttle opening degree is often caused to be relatively small. If the throttle opening degree is increased in advance compared to the throttle opening degree at the starting time point of the brake LDA, the output responsiveness of the engine 18 can be improved. Particularly, since there is a time lag between when the throttle opening degree is increased and when the intake air quantity actually increases, it is meaningful to increase the throttle opening degree in advance.

E. Control Operation of Intake Valve and Exhaust Valve

In E-1 to E-3 below, the engine 18 is postulated to have a variable valve mechanism.

E-1. Lift Amount of Intake Valve

In order to cause the engine 18 to be in the high response state, the LDA control portion 172 controls the engine control portion 173 such that the lift amount of an intake valve increases compared to the lift amount of the intake valve at the starting time point of the brake LDA.

Figure 8:
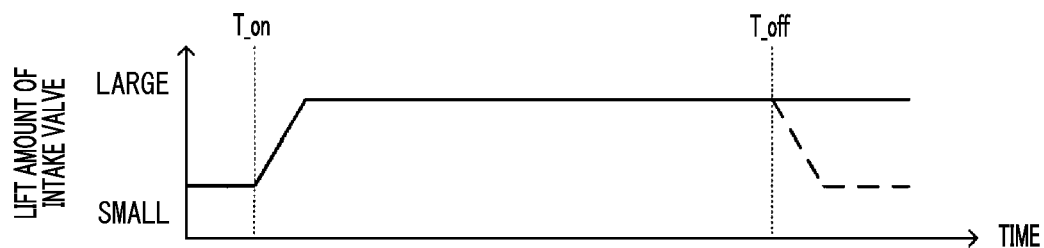
FIG. 8 is a time chart illustrating an example of variation in a lift amount of an intake valve, which is a part of the reacceleration preparing operation according to the first embodiment.

While the vehicle 1 is on a cruise, the demanded output of the engine 18 is small compared to when the vehicle 1 accelerates. Therefore, for example, as illustrated in FIG. 8, the lift amount of the intake valve is often caused to be relatively small. The case where the lift amount of the intake valve is relatively small may include a case where the cylinders are at a standstill. If the lift amount of the intake valve is increased in advance compared to the lift amount of the intake valve at the starting time point of the brake LDA, the output responsiveness of the engine 18 can be improved. Changing the lift amount of the intake valve is satisfied as long as the lift amount of the intake valve of at least one of the cylinders included in the engine 18 changes.

E-2. Valve Closing Phase of Intake Valve

In order to cause the engine 18 to be in the high response state, the LDA control portion 172 controls the engine control portion 173 such that a valve closing phase of the intake valve changes to a side on which an air-filling rate rises compared to the valve closing phase of the intake valve at the starting time point of the brake LDA. Here, the expression "side on which air-filling rate rises" denotes that (i) the valve closing phase of the intake valve is caused to advance when the valve closing phase of the intake valve is behind the bottom dead point (so-called delayed closing), and (ii) the valve closing phase of the intake valve is caused to be delayed when the valve closing phase of the intake valve precedes the bottom dead point (so-called early closing).

Figure 9A:
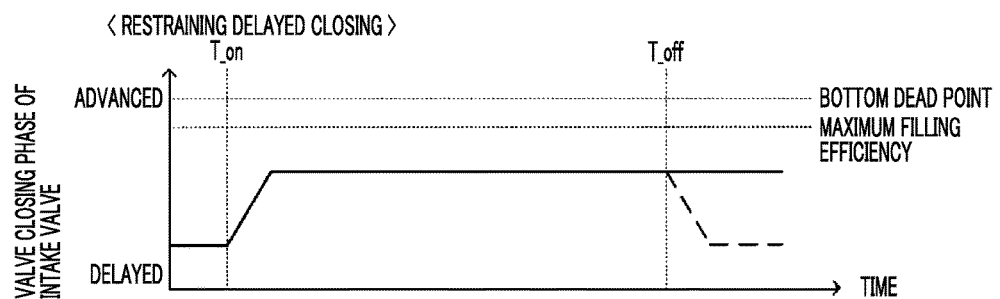
FIG. 9A is a time chart illustrating an example of variation in a valve closing phase of the intake valve, which is a part of the reacceleration preparing operation according to the first embodiment.
Figure 9B:
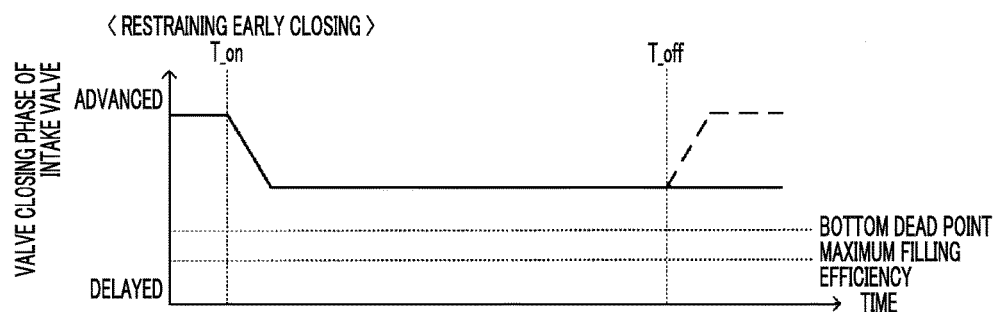
FIG. 9B is a time chart illustrating another example of variation in the valve closing phase of the intake valve, which is a part of the reacceleration preparing operation according to the first embodiment.

While the vehicle 1 is on a cruise, the demanded output of the engine 18 is small compared to when the vehicle 1 accelerates. Therefore, for example, as illustrated in FIG. 9A, the valve closing phase of the intake valve at the time of the so-called delayed closing is often caused to shift to the delayed side from the bottom dead point to a relatively great extent. Similarly, for example, as illustrated in FIG. 9B, the valve closing phase of the intake valve at the time of the so-called early closing is often caused to shift to the advanced side from the bottom dead point to a relatively great extent. If the valve closing phase of the intake valve is changed in advance to the side on which the air-filling rate rises compared to the valve closing phase of the intake valve at the starting time point of the brake LDA, the output responsiveness of the engine 18 can be improved. Changing the valve closing phase of the intake valve is satisfied as long as the valve closing phase of the intake valve of at least one of the cylinders included in the engine 18 changes.

E-3. Overlap Amount

Other than Scavenging Region

In order to cause the engine 18 to be in the high response state, the LDA control portion 172 controls the engine control portion 173 such that a valve overlap period that is a time period in which the intake valve and an exhaust valve are simultaneously open is shortened compared to the valve overlap period at the starting time point of the brake LDA (in other words, an overlap amount is reduced compared to the overlap amount at the starting time point of the brake LDA).

Figure 10A:
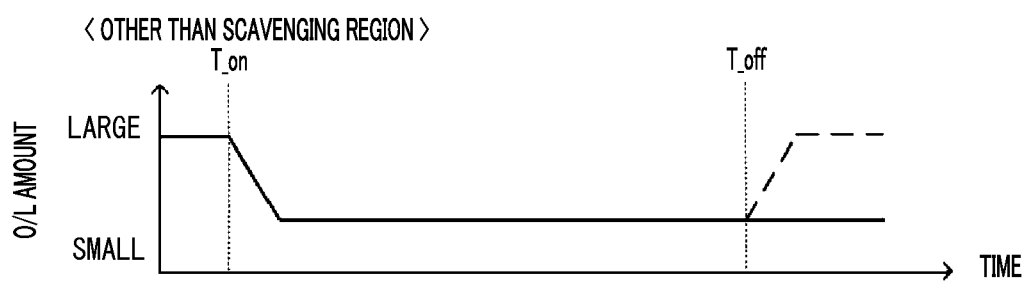
FIG. 10A is a time chart illustrating an example of variation in an overlap amount, which is a part of the reacceleration preparing operation according to the first embodiment.

While the vehicle 1 is on a cruise, from the viewpoint of improving the fuel efficiency and the like, for example, as illustrated in FIG. 10A, the overlap (O/L) amount is often caused to relatively increase (that is, the valve overlap period is caused to be relatively lengthened). An effect of the so-called internal EGR is obtained due to the valve overlap. If the overlap amount is increased in advance compared to the overlap amount at the starting time point of the brake LDA, the volume of oxygen inside the cylinder can increase. As a result, the output responsiveness of the engine 18 can be improved. Changing the overlap amount is satisfied as long as the overlap amount of at least one of the cylinders included in the engine 18 changes.

Scavenging Region

In the vehicle 1, the engine 18 is controlled by the engine control portion 173 while the engine 18 is in operation such that an operation point indicating the operation state of the engine 18 moves on a predetermined operation line in a coordinate system defined by the engine rotation frequency and engine torque.

In order to cause the engine 18 to be in the high response state, the LDA control portion 172 controls the engine control portion 173 such that the valve overlap period is lengthened compared to the valve overlap period at the starting time point of the brake LDA (in other words, the overlap amount is large compared to the overlap amount at the starting time point of the brake LDA) when the operation point of the engine 18 is in a scavenging region within the coordinate system.

Figure 10B:
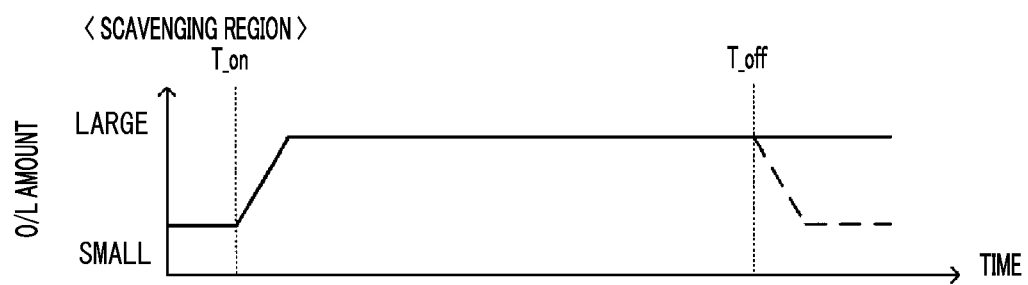
FIG. 10B is a time chart illustrating another example of variation in the overlap amount, which is a part of the reacceleration preparing operation according to the first embodiment.

When the operation point of the engine 18 is in the scavenging region, the engine rotation frequency is relatively low and the demanded output of the engine 18 is relatively small. Therefore, for example, as illustrated in FIG. 10B, the overlap amount is often caused to be relatively small (that is, the valve overlap period is relatively short).

In a case where the operation point of the engine 18 is in the scavenging region, when the overlap amount is increased in advance compared to the overlap amount at the starting time point of the brake LDA, the output responsiveness of the engine 18 can be improved. It is because in a case where the operation point of the engine 18 is the scavenging region, when the overlap amount is increased, the differential pressure caused between the intake side and the exhaust side of the engine 18 rises compared to the differential pressure before the overlap amount is increased, so that the air intake and scavenging residual gas are more efficiently performed. Changing the overlap amount is satisfied as long as the overlap amount of at least one of the cylinders included in the engine 18 changes.

F. Compression Ratio

The engine 18 is postulated to be configured to be a so-called variable compression ratio engine. In this case, in order to cause the engine 18 to be in the high response state, the LDA control portion 172 controls the engine control portion 173 such that the compression ratio of the engine 18 is reduced compared to the compression ratio at the starting time point of the brake LDA.

Figure 11:
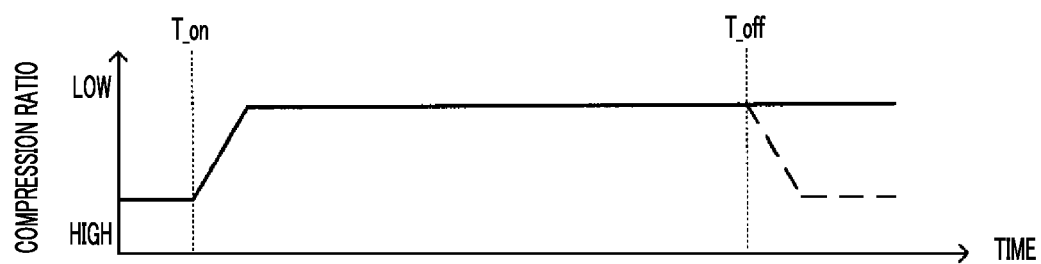
FIG. 11 is a time chart illustrating an example of variation in a compression ratio, which is a part of the reacceleration preparing operation according to the first embodiment.

While the vehicle 1 is on a cruise (that is, when the engine load is relatively small), the engine efficiency can be enhanced when the compression ratio is increased. Therefore, for example, as illustrated in FIG. 11, the compression ratio is often caused to be relatively increased. However, in a case where the vehicle 1 accelerates (that is, when the engine load is relatively high), when the compression ratio is significant, knocking is likely to occur. Since it takes time in changing the compression ratio to a great or small extent, the compression ratio is reduced in advance compared to the compression ratio at the starting time point of the brake LDA, and then, the output responsiveness of the engine 18 can be improved.

G. Turbocharging Pressure

Figure 12A:
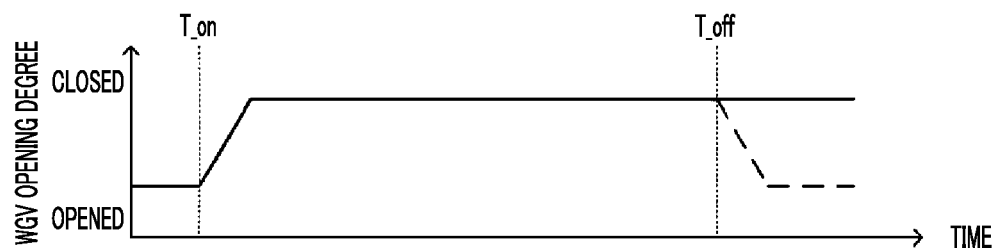
FIG. 12A is a time chart illustrating an example of variation in a waste gate valve opening degree, which is a part of the reacceleration preparing operation according to the first embodiment.
Figure 12B:
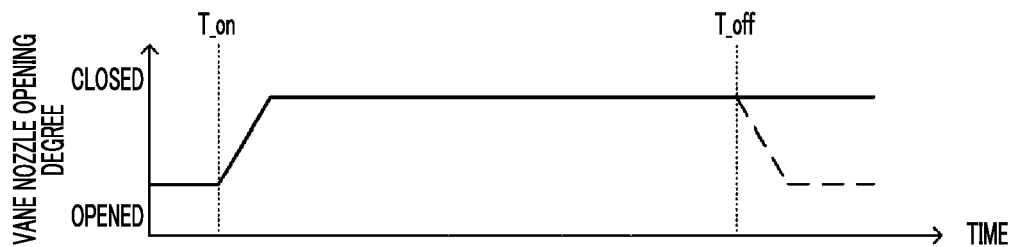
FIG. 12B is a time chart illustrating an example of variation in a nozzle vane opening degree, which is a part of the reacceleration preparing operation according to the first embodiment.

The engine 18 is postulated to have a turbocharger. In this case, in order to cause the engine 18 to be in the high response state, the LDA control portion 172 causes the turbocharger to be in a state where the turbocharging pressure is likely to rise compared to the turbocharging pressure at the starting time point of the brake LDA. The turbocharging pressure may be raised through controlling a waste gate valve (WGV) such that the waste gate valve shifts to the closing side. When the turbocharger is a so-called variable nozzle turbo, the turbocharging pressure may be raised through controlling a nozzle vane such that the nozzle vane shifts to the closing side. In this case, the LDA control portion 172 controls the engine control portion 173 such that at least one of the WGV opening degree and the nozzle vane opening degree is reduced. While the vehicle 1 is on a cruise, the demanded output of the engine 18 is small compared to when the vehicle 1 accelerates. Therefore, for example, as illustrated in FIGS. 12A and 12B, the WGV opening degree and the nozzle vane opening degree are often caused to be relatively increased. If at least one of the WGV opening degree and the nozzle vane opening degree is reduced in advance compared to the one of the WGV opening degree and the nozzle vane opening degree at the starting time point of the brake LDA, the effect of turbocharging can be obtained from when the rotation frequency of the engine 18 is relatively low. As a result, the output responsiveness of the engine 18 can be improved.

H. Variable Muffler

A variable muffler is postulated to be installed on the exhaust side of the engine 18. In this case, in order to cause the engine 18 to be in the high response state, the LDA control portion 172 controls the engine control portion 173 such that a pressure loss that is the pressure difference between a muffler entrance and a muffler exit in the variable muffler is reduced compared to the pressure loss at the starting time point of the brake LDA. As a result, a variable valve of the variable muffler is controlled such that the length of an exhaust flow channel of the variable muffler is shortened.

Figure 13:
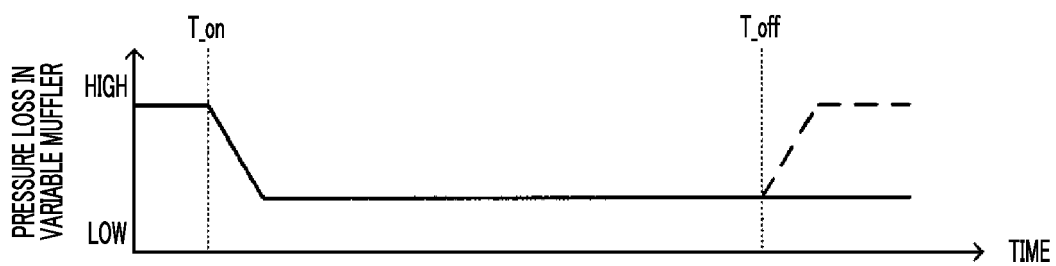
FIG. 13 is a time chart illustrating an example of variation in a pressure loss of a variable muffler, which is a part of the reacceleration preparing operation according to the first embodiment.

While the vehicle 1 is on a cruise, for example, as illustrated in FIG. 13, the pressure loss (pressure loss in the variable muffler) is often relatively high. That is, the pressure difference between the muffler entrance and the muffler exit is often relatively significant. Here, since the pressure at the muffler exit is equal to the atmospheric pressure, relatively high pressure loss denotes that the back pressure of the engine 18 is relatively high.

If the pressure loss is reduced in advance compared to the pressure loss at the starting time point of the brake LDA, the back pressure of the engine 18 can be lowered. As a result, for example, the intake efficiency is improved, so that the output responsiveness of the engine 18 can be improved.

I. PCV Flow Rate

The engine 18 is postulated to have a turbocharger. Moreover, the engine 18 is postulated to have a PCV mechanism that causes blowby gas to flow back via a PCV flow channel connecting a crankcase of the engine 18 and a downstream side of a compressor of the turbocharger in an intake passage, and an ejector that causes blowby gas to flow back via a flow channel connecting the crankcase and an upstream side of the compressor of the turbocharger in the intake passage. Since an existing technology can be applied to the PCV mechanism and the ejector, its detailed descriptions will not be repeated.

In this case, in order to cause the engine 18 to be in the high response state, the LDA control portion 172 controls the engine control portion 173 such that the flow rate of the blowby gas caused to flow back by the PCV mechanism is reduced compared to the flow rate of the blowby gas at the starting time point of the brake LDA (specifically, such that at least one of the opening degree of a PCV valve provided in the PCV flow channel, and the ejector is controlled).

Figure 14:
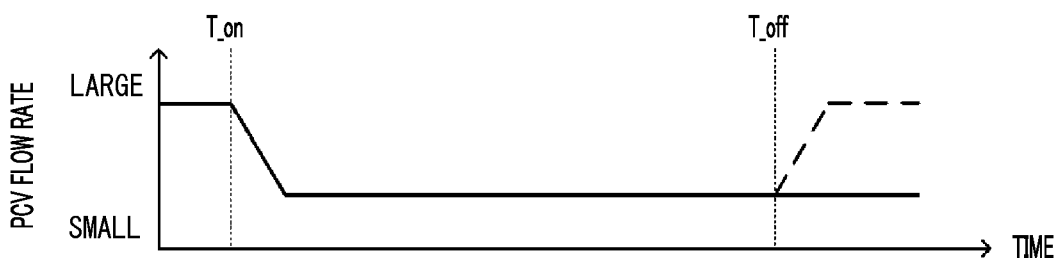
FIG. 14 is a time chart illustrating an example of variation in a PCV flow rate, which is a part of the reacceleration preparing operation according to the first embodiment.

In a non-turbocharging region, the blowby gas is caused to flow back via the PCV flow channel. In a turbocharging region, the blowby gas is caused to flow back by the ejector. While the vehicle 1 is on a cruise, the engine 18 is often in operation in the non-turbocharging region. Therefore, for example, as illustrated in FIG. 14, the flow rate of the blowby gas (PCV flow rate) flowing back via the PCV flow channel is often reduced compared to the flow rate of the blowby gas at the starting time point of the brake LDA.

If the PCV flow rate is reduced in advance compared to the PCV flow rate at the starting time point of the brake LDA, the turbocharger can operate in a relatively early stage after the driver steps on the accelerator pedal 181. As a result, the output responsiveness of the engine 18 can be improved.

Technical Effect

In the lane departure restraining operation according to the present embodiment, when there is a possibility that the vehicle 1 will depart from the travelling lane, a restraining yaw moment is applied to the vehicle 1. Therefore, the vehicle 1 can be restrained from departing from a travelling lane.

A technical effect in the reacceleration preparing operation according to the present embodiment will be described with reference to the time chart in FIG. 4. FIG. 4 is a time chart when the air-fuel ratio changes. Similarly, FIGS. 5 to 14 respectively illustrate time charts of various parameters.

At time point T_on in FIG. 4, when the control flag related to the brake LDA is caused to be ON, a restraining yaw moment is applied to the vehicle 1 due to the brake LDA, and the vehicle 1 decelerates (refer to the graph related to the vehicle speed on the lowermost line in FIG. 4).

In this case, the LDA control portion 172 determines through the determination in Step S202 (refer to FIG. 3) that an acceleration demand of the driver is estimated, and the flag related to a high response demand is postulated to be ON. In the example of FIG. 4, in order to cause the state of the engine 18 to shift to a high response state, the LDA control portion 172 causes the engine control portion 173 to reduce the air-fuel ratio compared to the air-fuel ratio at the starting time point of the brake LDA (that is, time point T_on). Therefore, for example, at time T1, when the driver performs an accelerating operation (that is, when the driver steps on the accelerator pedal 181), relatively significant driving force is instantly output from the engine 18, so that the vehicle 1 can promptly accelerate. As a result, the vehicle 1 can promptly regain the speed before the deceleration.

After the flag related to a high response demand is caused to be ON, when the LDA control portion 172 determines through the determination in Step S205 (refer to FIG. 3) that there is no acceleration demand of the driver, the LDA control portion 172 cancels the high response state and causes the flag related to a high response demand to be OFF (refer to the dotted line in FIG. 4). In the example illustrated in FIG. 4, the air-fuel ratio regains the value at the starting time point of the brake LDA. That is, in the reacceleration preparing operation according to the present embodiment, when the LDA control portion 172 determines that there is no acceleration demand of the driver, for example, the state of the engine 18 shifts to a state where improvement of the fuel efficiency can be achieved.

In the present embodiment, "LDA control portion 172" and "engine control portion 173" are examples of "electronic control device".

Modification Examples

First Modification Example

In the embodiment described above, a case where the vehicle 1 automatically decelerates due to the lane departure restraining operation (that is, the brake LDA) has been described. The disclosure can also be applied to a case where the vehicle 1 automatically decelerates due to pre-crash safety (PCS) or adaptive cruise control (ACC).

Specifically, when the vehicle 1 automatically decelerates due to the PCS or the ACC, it is assumed that the driver of the vehicle 1 avoids a preceding vehicle or an obstacle, for example, by changing the course, and then, the driver reaccelerates the vehicle 1.

In this case, the ECU 17 that is an example of the vehicle control apparatus acquires a estimated deceleration amount or an actual deceleration amount of the deceleration caused due to the PCS or the ACC, through the processing in Step S201 illustrated in FIG. 3. Subsequently, the ECU 17 determines through the processing in Step S202 whether or not an acceleration demand of the driver is estimated after the deceleration caused due to the PCS or the ACC. When the ECU 17 determines in this determination that an acceleration demand of the driver is estimated (Yes in Step S202), the ECU 17 causes the flag related to a high response demand to be ON and controls the engine 18 such that the state of the engine 18 shifts to the high response state (Step S203).

As described above, when the vehicle 1 automatically decelerates due to the PCS or the ACC, it is assumed that the driver changes the course, that is, operates a turn signal. Therefore, the ECU 17 may determine through the processing in Step S205 illustrated in FIG. 3 that there is no acceleration demand of the driver when the vehicle 1 decelerates due to the PCS or the ACC, and then, a predetermined time period elapses after the turn signal is operated.

Moreover, the ECU 17 may determine through the processing in Step S205 that there is no acceleration demand of the driver (i) when the vehicle 1 decelerates due to the PCS or the ACC, and then, there is no variation in the stepping operation amount of the accelerator pedal 181 or the amount of variation in the stepping operation amount is within a predetermined range for a predetermined time period, and (ii) when the flag related to a high response demand is caused to be ON, and then, a different vehicle or an obstacle is detected within a predetermined distance range ahead of the vehicle 1.

Second Modification Example

Moreover, the embodiment described above can also be applied to side wind control in which the difference in braking force on the right and left is utilized and a yaw moment is applied to the vehicle 1. In this case, the ECU 17 that is an example of the vehicle control apparatus acquires a estimated deceleration amount or an actual deceleration amount of the deceleration caused due to the side wind control, through the processing in Step S201 illustrated in FIG. 3. Subsequently, the ECU 17 determines through the processing in Step S202 whether or not an acceleration demand of the driver is estimated after the deceleration caused due to the side wind control. When the ECU 17 determines in this determination that an acceleration demand of the driver is estimated (Yes in Step S202), the ECU 17 causes the flag related to a high response demand to be ON and controls the engine 18 such that the state of the engine 18 shifts to the high response state (Step S203).

The ECU 17 may determine through the processing in Step S205 that there is no acceleration demand of the driver (i) when the vehicle 1 decelerates due to the side wind control, and then, there is no variation in the stepping operation amount of the accelerator pedal 181 or the amount of variation in the stepping operation amount is within a predetermined range for a predetermined time period, and (ii) when the flag related to a high response demand is caused to be ON, and then, a different vehicle or an obstacle is detected within a predetermined distance range ahead of the vehicle 1.

Second Embodiment

A second embodiment of a vehicle control apparatus according to the disclosure will be described with reference to FIG. 15. In the first embodiment, the reacceleration preparing operation in a case where there is a possibility that reacceleration will be performed immediately after the vehicle 1 automatically decelerates has been described. The disclosure is not limited to the reacceleration performed immediately after deceleration and can also be applied to a case where there is a possibility that acceleration will be performed while the vehicle 1 is travelling. In the second embodiment below, descriptions will proceed by using a vehicle 1 in which the vehicle control apparatus of the disclosure is mounted. The configuration of the vehicle 1 is similar to the configuration in the first embodiment. Therefore, in regard to the second embodiment, suitably, descriptions overlapping with those in the first embodiment will not be repeated. The same reference signs will be applied to the common elements in the drawings, and merely the points that are basically different from those in the first embodiment will be described with reference to FIG. 15.

Acceleration Preparing Operation

While the vehicle 1 is travelling, there are occasions with high possibility that a driver of the vehicle 1 will perform an accelerating operation. However, in most of the cases, the driver performs an accelerating operation (for example, steps on an accelerator pedal 181), and then, a control operation of increasing the output of the engine 18 is performed. Moreover, although the driver has performed an accelerating operation, there are cases where a control operation in which the fuel efficiency has precedence over acceleration responsiveness of the vehicle 1 is performed depending on the stepping operation amount of the accelerator pedal 181 (that is, the accelerator operation amount). That is, unless countermeasures are employed in some way, in spite of the occasions with a high possibility that the driver will perform an accelerating operation, sufficient driving force is not output from the engine 18 when the vehicle 1 accelerates, so that the vehicle 1 does not promptly accelerate.

Figure 15:
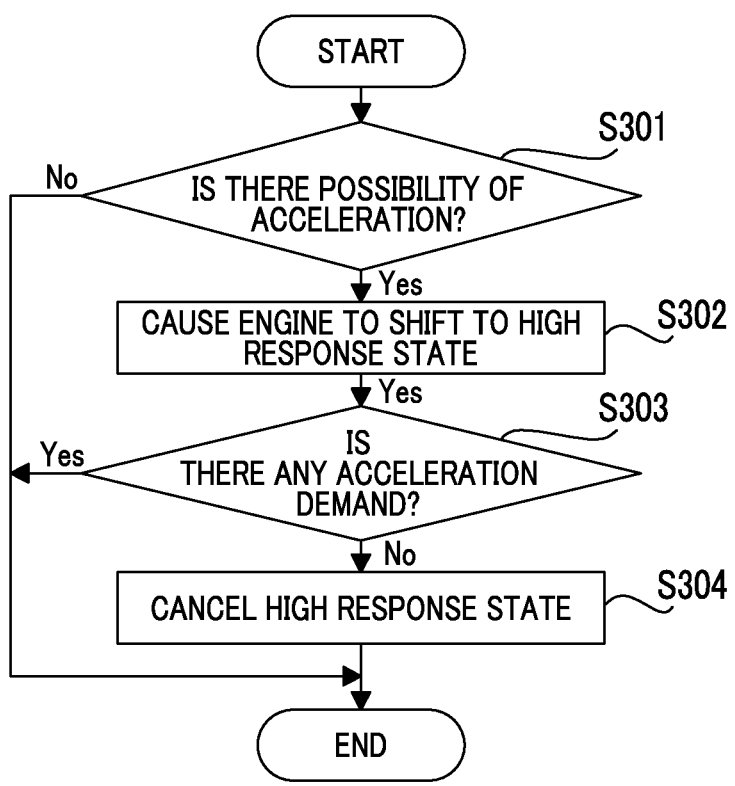
FIG. 15 is a flowchart illustrating an acceleration preparing operation according to a second embodiment.

In the present embodiment, in order to cope with an accelerating operation performed by the driver when the vehicle 1 is travelling while the engine 18 is in operation, the ECU 17 as an example of the vehicle control apparatus causes the engine 18 to execute an acceleration preparing operation illustrated in FIG. 15.

In FIG. 15, first, the ECU 17 determines whether or not a possibility of an accelerating operation to be performed by the driver of the vehicle 1 (that is, an acceleration demand of the driver) is estimated (Step S301). Specifically, the ECU 17 determines that the acceleration demand of the driver is estimated when at least one of the following conditions (i) to (v) is fulfilled. The conditions (i) to (v) respectively correspond to specific examples of "the occasion with a high possibility that the driver of the vehicle 1 will perform an accelerating operation". (i) In a travelling lane in which the vehicle 1 is travelling, a preceding vehicle travelling immediately ahead of the vehicle 1 departs (or has departed) from the travelling lane. In this case, an acceleration demand of the driver is estimated because there is a high possibility that the driver of the vehicle 1 will perform an accelerating operation in order to narrow the distance between the vehicle 1 and a vehicle (that is, a new preceding vehicle) travelling ahead of the preceding vehicle that has departed from the travelling lane. Here, the ECU 17 may determine whether or not the preceding vehicle has departed from the travelling lane based on, for example, an image that is imaged by the camera 155 and shows an are ahead of the vehicle 1, and the lateral speed or the lateral location of the preceding vehicle obtained from the detection results of a millimeter-wave radar (not illustrated). Alternatively, when communication can be performed between the vehicle 1 and the preceding vehicle, the lane departure of the preceding vehicle may be determined based on the lateral speed or the lateral location of the preceding vehicle acquired through the communication, or information related to an operation of the turn signal. (ii) When the vehicle 1 has a function of cruise control, the vehicle speed set for the cruise control is changed to a vehicle speed higher than the current vehicle speed. In this case, an acceleration demand of the driver is estimated because the vehicle 1 accelerates such that the actual vehicle speed follows the set vehicle speed. (iii) While the vehicle 1 is travelling toward a traffic light installed ahead of the vehicle 1 in its moving direction, the color of the traffic light changes from red to green. In this case, an acceleration demand of the driver is estimated because there is a high possibility that the driver who has recognized that he/she could pass the intersection where the traffic light is installed, will perform an accelerating operation. Here, for example, information related to the color of the traffic light may be acquired through road-to-vehicle communication. Alternatively, the color of the traffic light which has changed from red to green may be detected based on an image imaged by the camera 155. (iv) The vehicle 1 is currently travelling on a level road or a downhill road, and an uphill road is present ahead of the vehicle 1 in its moving direction. In this case, an acceleration demand of the driver is estimated because there is a high possibility that the driver will perform an accelerating operation when the vehicle 1 enters the uphill road. Here, information related to the roads on which the vehicle 1 travels may be acquired based on, for example, positional information of the vehicle 1, a map database, and a scheduled course of the vehicle 1. (v) The vehicle 1 is currently travelling on a curved road, and a straight road is present ahead of the vehicle 1 in its moving direction. In this case, an acceleration demand of the driver is estimated because there is a high possibility that the driver will perform an accelerating operation when the vehicle 1 escapes from the curved road.

When the ECU 17 determines through the determination in Step S301 that no acceleration demand of the driver is estimated (No in Step S301), the acceleration preparing operation of the engine 18 illustrated in FIG. 15 ends. Thereafter, after the lapse of a third predetermined time period (for example, several milliseconds to several tens of milliseconds), the ECU 17 causes the engine 18 to restart the acceleration preparing operation illustrated in FIG. 15. That is, the acceleration preparing operation of the engine 18 illustrated in FIG. 15 is repetitively performed on a cycle corresponding to the third predetermined time period.

On the other hand, when the ECU 17 determines through the determination in Step S301 that an acceleration demand of the driver is estimated (Yes in Step S301), the engine control portion 173 of the ECU 17 causes a flag related to a high response demand to be ON and controls the engine 18 such that the state of the engine 18 shifts to a high response state that is a state where output responsiveness related to the engine 18 can be improved (Step S302). The high response state may be referred to "the high response state of the engine" described above.

Thereafter, the ECU 17 determines whether or not determination conditions for determining that there is no acceleration demand of the driver are fulfilled (Step S303). Examples of the determination conditions are as follows: (i) the flag related to a high response demand is caused to be ON, and then, there is no variation in the stepping operation amount of the accelerator pedal 181 or the amount of variation in the stepping operation amount is within a predetermined variation range for a fifth predetermined time period; and (ii) the flag related to a high response demand is caused to be ON, and then, a different vehicle or an obstacle is detected within a fourth distance range ahead of the vehicle 1.

When the ECU 17 determines through the determination in Step S303 that there is no acceleration demand of the driver (No in Step S303), the engine control portion 173 controls the engine 18 such that the high response state is cancelled, and the ECU 17 causes the flag related to a high response demand to be OFF (Step S304).

On the other hand, when the ECU 17 determines through the determination in Step S303 that there are any acceleration demand of the driver (Yes in Step S303), the acceleration preparing operation of the engine 18 illustrated in FIG. 15 ends. Here, since the flag related to a high response demand is ON, the ECU 17 restarts the acceleration preparing operation of the engine 18 illustrated in FIG. 15 after the lapse of the third predetermined time period. In this case, the processing in Step S303 is executed again.

Technical Effect

In an acceleration preparing operation according to the present embodiment, when an acceleration demand of a driver is estimated (that is, before a driver performs an accelerating operation), the state of the engine 18 shifts to a high response state. Therefore, when the driver performs the accelerating operation, relatively significant driving force is instantly output from the engine 18, so that the vehicle 1 can promptly accelerate.

A vehicle control apparatus includes an electronic control device configured to perform acceleration preparation in which an internal combustion engine is controlled such that a response delay of the internal combustion engine at the time of acceleration is restrained for a predetermined time period from the time point at which the acceleration demand of the driver of the vehicle is estimated when the acceleration demand is estimated while the vehicle is travelling using the driving force from the internal combustion engine.

With the vehicle control apparatus, the internal combustion engine is controlled such that the response delay of the internal combustion engine at the time of acceleration is restrained for the predetermined time period from the time point at which the acceleration demand is estimated when the acceleration demand of the driver is estimated while the vehicle is travelling (that is, before the driver performs the accelerating operation). In other words, the internal combustion engine is controlled such that the vehicle is more likely to accelerate. Specifically, in the vehicle control apparatus, the internal combustion engine is controlled such that the internal combustion engine is in a state where output responsiveness related to the internal combustion engine can be improved for the predetermined time period from the time point at which the acceleration demand of the driver is estimated (that is, a state where the internal combustion engine can sufficiently exhibit its performance). Therefore, with the vehicle control apparatus, it is possible to restrain a response delay of an internal combustion engine when a driver performs an accelerating operation while a vehicle is travelling.

Here, examples of a control operation for restraining the response delay of the internal combustion engine are as follows: (i) changing the air-fuel ratio to a lower side; (ii) reducing the EGR rate when exhaust gas recirculation (EGR) is employed; (iii) reducing the number of cylinders at a standstill or the number of cylinders brought to a halt in fuel supply when the internal combustion engine is configured to be able to bring a part of the cylinders to a standstill or to be able to bring a part of the cylinders to a halt in fuel supply while the internal combustion engine is in operation; (iv) increasing the throttle opening degree; (v) changing at least one of the lift amount of an intake valve, the valve closing phase of the intake valve, and the valve overlap period when the internal combustion engine is provided with the variable valve mechanism; (vi) reducing the compression ratio when the internal combustion engine is a so-called variable compression ratio engine; (vii) controlling a turbocharger in which the turbocharging pressure is likely to rise, when the internal combustion engine is provided with the turbocharger; (viii) reducing a pressure loss in a variable muffler when the variable muffler is provided on an exhaust side of the internal combustion engine; and (ix) reducing the flow rate of blowby gas caused to flow back by a positive crankcase ventilation (PCV) mechanism, when the internal combustion engine is provided with the PCV mechanism.

Examples of "a case where acceleration demand is estimated" include the following cases: (i) a case where the vehicle automatically decelerates independently from an operation of the driver (that is, a deceleration support is executed) and there are no objects, for example, a preceding vehicle and an obstacle that can hinder the vehicle from travelling, within a first distance range ahead of the vehicle; (ii) a case where in a travelling lane in which a host vehicle is travelling, a preceding vehicle travelling immediately ahead of the host vehicle departs from the travelling lane (for example, the preceding vehicle changes the lane); (iii) a case where a set vehicle speed related to cruise control is changed to a high vehicle speed side; (iv) a case where the color of a traffic light changes from red to green while the vehicle is travelling toward the traffic light installed ahead of the vehicle in its moving direction; and (v) a case where an uphill road is present ahead of the vehicle in its moving direction while the vehicle is travelling on a level road or a downhill road, or a case where a straight road is present ahead of the vehicle in its moving direction while the vehicle is travelling on a curved road.

The value of "first distance range" may be set through a process of estimating an acceleration distance incidental to regaining the vehicle speed before the deceleration based on, for example, the degree of deceleration caused due to the deceleration support and a process of adding a vehicle-to-vehicle distance recommended for the speed before the deceleration to the estimated acceleration distance. Examples of "deceleration support" are not limited to the control operations in which the vehicle decelerates due to the braking force applied to the vehicle. The examples also include a control operation in which the vehicle decelerates due to reducing or cutting off the driving force applied to driving wheels of the vehicle. As a specific example of the deceleration support, at least one of tire-wheel assemblies of the vehicle is provided with braking force that is applied by a braking device (so-called brake lane departure alert (LDA)) and generates a yaw moment in a direction avoiding lane departure of the vehicle, when there is a possibility that the vehicle will depart from the travelling lane in which the vehicle is currently travelling. Moreover, the examples of the deceleration support also include a deceleration control operation performed through pre-crash safety (PCS) or adaptive cruise control (ACC).

A preceding vehicle departing from the travelling lane may be detected based on, for example, an image that is imaged by an in-vehicle camera and shows an area ahead of the host vehicle, the lateral speed or the lateral location of the preceding vehicle obtained from detection results and the like of a millimeter-wave radar, the lateral speed or the lateral location of the preceding vehicle acquired through vehicle-to-vehicle communication, and information related to an operation of a turn signal. Information related to the color of the traffic light may be acquired through road-to-vehicle communication, for example. Information related to the road on which the vehicle is travelling may be acquired based on, for example, positional information acquired from the global positioning system (GPS), a map database, and a scheduled course of the vehicle.

The term "predetermined time period" indicates a time period in which the internal combustion engine is controlled such that the response delay of the internal combustion engine at the time of acceleration is restrained. The parameter "predetermined time period" may be suitably set in accordance with circumstances where an acceleration demand is estimated. Specifically, for example, when the deceleration support is executed, the parameter "predetermined time period" may be set as a time period having a relatively high possibility of an accelerating operation to be performed by the driver who intends to regain the speed before the deceleration after the deceleration support starts, the speed that has been lowered due to the deceleration support. When a preceding vehicle travelling immediately ahead of the host vehicle departs from the travelling lane of the host vehicle, the parameter "predetermined time period" may be set as a time period having a relatively high possibility of an accelerating operation to be performed by the driver who intends to narrow the vehicle-to-vehicle distance to a vehicle (that is, a new preceding vehicle) travelling immediately ahead of the preceding vehicle that has departed from the travelling lane. When the color of the traffic light changes from red to green, the parameter "predetermined time period" may be set as a time period having a relatively high possibility of an accelerating operation to be performed by the driver who intends to regain the cruising speed that has been lowered for stopping at the traffic light.

The disclosure is not limited to the embodiments described above and can be suitably changed within the scope of the aspects of the disclosure. A vehicle control apparatus accompanying such a change is also included in the technical scope of the disclosure.

What is claimed is:

1. A vehicle control apparatus comprising an electronic control device configured to perform acceleration preparation in which an internal combustion engine is controlled such that a response delay of the internal combustion engine at a time of acceleration is restrained for a predetermined time period from a time point at which an acceleration demand of a driver of a vehicle is estimated when the acceleration demand is estimated while the vehicle is travelling using a driving force from the internal combustion engine, wherein the electronic control device is configured to control the internal combustion engine such that the internal combustion engine is in a predetermined state in which output responsiveness related to the internal combustion engine is further improved than the output responsiveness at a starting time point of a deceleration support, for the predetermined time period when the acceleration demand of the driver of the vehicle is estimated due to an execution of the deceleration support with which the vehicle automatically decelerates in response to at least one of reduction of the driving force from the internal combustion engine and braking force applied by a braking device of the vehicle.

2. The vehicle control apparatus according to claim 1, wherein the deceleration support provides at least one of tire-wheel assemblies of the vehicle with braking force that is applied by the braking device and generates a yaw moment in a direction avoiding lane departure of the vehicle, when there is a possibility that the vehicle departs from a travelling lane in which the vehicle is currently travelling.

3. The vehicle control apparatus according to claim 1, wherein the electronic control device is configured to control at least one of an intake air quantity and a fuel supply quantity of the internal combustion engine such that an air-fuel ratio of the internal combustion engine varies to be in a lower side compared to the air-fuel ratio at the starting time point of the deceleration support so as to cause the internal combustion engine to be in the predetermined state.

4. The vehicle control apparatus according to claim 1, wherein the internal combustion engine is configured to mix a part of exhaust gas with intake air while the internal combustion engine is in operation, and wherein the electronic control device is configured to control the internal combustion engine such that a ratio of a quantity of exhaust gas flowing into a cylinder of the internal combustion engine to a quantity of air flowing into the cylinder of the internal combustion engine drops compared to the ratio of the quantity of exhaust gas to the quantity of air at the starting time point of the deceleration support so as to cause the internal combustion engine to be in the predetermined state.

5. The vehicle control apparatus according to claim 1, wherein the internal combustion engine has a plurality of cylinders and is configured to bring a part of the cylinders to a standstill or to bring the part of the cylinders to a halt in fuel supply while the internal combustion engine is in operation, and wherein the electronic control device is configured to control the internal combustion engine such that among the cylinders, the number of cylinders brought to a standstill or brought to a halt in fuel supply is reduced compared to the number of cylinders at the starting time point of the deceleration support so as to cause the internal combustion engine to be in the predetermined state.

6. The vehicle control apparatus according to claim 1, wherein the electronic control device is configured to control the internal combustion engine such that a throttle opening degree increases compared to the throttle opening degree at the starting time point of the deceleration support so as to cause the internal combustion engine to be in the predetermined state.

7. The vehicle control apparatus according to claim 1,
wherein the internal combustion engine has a variable valve mechanism, and wherein the electronic control device is configured to control the variable valve mechanism such that at least one of i) a lift amount of an intake valve of the internal combustion engine, ii) a valve closing phase of the intake valve, and iii) a valve overlap period that is a time period in which the intake valve and an exhaust valve of the internal combustion engine are simultaneously open changes so as to cause the internal combustion engine to be in the predetermined state.

8. The vehicle control apparatus according to claim 7, wherein the electronic control device is configured to control the variable valve mechanism such that the lift amount of the intake valve increases compared to the lift amount at the starting time point of the deceleration support.

9. The vehicle control apparatus according to claim 7, wherein the electronic control device is configured to control the variable valve mechanism such that the valve closing phase of the intake valve changes to a side on which an air-filling rate rises compared to the valve closing phase of the intake valve at the starting time point of the deceleration support.

10. The vehicle control apparatus according to claim 7, wherein the electronic control device is configured to control the variable valve mechanism such that the valve overlap period is shortened compared to the valve overlap period at the starting time point of the deceleration support.

11. The vehicle control apparatus according to claim 7,
wherein the electronic control device is configured to control the internal combustion engine while the internal combustion engine is in operation such that an operation point indicating an operation state of the internal combustion engine moves on a predetermined operation line in a coordinate system defined by a rotation frequency of the internal combustion engine and torque of the internal combustion engine, and wherein the electronic control device is configured to control the variable valve mechanism such that the valve overlap period is lengthened compared to the valve overlap period at the starting time point of the deceleration support when the operation point is in a scavenging region within the coordinate system.

12. The vehicle control apparatus according to claim 1,
wherein the internal combustion engine is configured to change a compression ratio while the internal combustion engine is in operation, and wherein the electronic control device is configured to control the internal combustion engine such that the compression ratio of the internal combustion engine is reduced compared to the compression ratio of the internal combustion engine at the starting time point of the deceleration support so as to cause the internal combustion engine to be in the predetermined state.

13. The vehicle control apparatus according to claim 1,
wherein the internal combustion engine has a turbocharger, and
wherein the electronic control device is configured to control the turbocharger such that turbocharging pressure of the turbocharger is likely to rise compared to a turbocharging pressure at the starting time point of the deceleration support so as to cause the internal combustion engine to be in the predetermined state.

14. The vehicle control apparatus according to claim 1,
wherein a variable muffler is installed on an exhaust side of the internal combustion engine, and
wherein the electronic control device is configured to control the variable muffler such that a pressure loss in the variable muffler is reduced compared to the pressure loss in the variable muffler at the starting time point of the deceleration support so as to cause the internal combustion engine to be in the predetermined state.

15. The vehicle control apparatus according to claim 1,
wherein the internal combustion engine has a turbocharger, a positive crankcase ventilation mechanism that causes blowby gas to flow back via a positive crankcase ventilation flow channel connecting a crankcase of the internal combustion engine and a downstream side of a compressor of the turbocharger in an intake passage of the internal combustion engine, and an ejector that causes blowby gas to flow back via a flow channel connecting the crankcase and an upstream side of the compressor of the turbocharger in the intake passage, and
wherein the electronic control device is configured to control at least one of the positive crankcase ventilation mechanism and the ejector such that a flow rate of blowby gas caused to flow back by the positive crankcase ventilation mechanism is reduced compared to the flow rate of blowby gas at the starting time point of the deceleration support so as to cause the internal combustion engine to be in the predetermined state.

\* \* \* \* \*